(12) United States Patent
Bischof et al.

(10) Patent No.: US 7,716,836 B2
(45) Date of Patent: May 18, 2010

(54) METHOD OF PRODUCING A PLAIN BEARING BUSH OR BEARING SHELL OF VARYING WIDTH

(75) Inventors: Ekkehard Bischof, Laupheim (DE); Gerhard Thumm, Erbach (DE)

(73) Assignee: Wieland-Werke AG, Ulm (DE)

( * ) Notice: Subject to any disclaimer, the term of this patent is extended or adjusted under 35 U.S.C. 154(b) by 1346 days.

(21) Appl. No.: 11/130,710

(22) Filed: May 17, 2005

(65) Prior Publication Data

US 2005/0259899 A1 Nov. 24, 2005

(30) Foreign Application Priority Data

May 19, 2004 (DE) .......................... 10 2004 024 746

(51) Int. Cl.
*B21K 1/10* (2006.01)

(52) U.S. Cl. ........................... 29/898.057; 29/898.054; 29/898.056; 29/898.042; 29/415; 29/414; 29/413; 29/412; 72/370.26; 72/379.6

(58) Field of Classification Search ............ 29/898.042, 29/898.054, 898.056, 898.057, 412–417; 384/276; 72/370.26, 379.6

See application file for complete search history.

(56) References Cited

U.S. PATENT DOCUMENTS

| 4,180,895 | A | * | 1/1980 | Spikes et al. ........... 29/898.056 |
| 4,191,040 | A | * | 3/1980 | Dewey ........................ 72/132 |
| 4,907,626 | A |   | 3/1990 | Mori |
| 6,475,635 | B1 | * | 11/2002 | Sakai et al. ................. 428/553 |
| 6,588,248 | B1 |   | 7/2003 | Bickle et al. |
| 2006/0002643 | A1 | * | 1/2006 | Aubele ....................... 384/288 |

FOREIGN PATENT DOCUMENTS

DE 199 07 571 A1 9/2000

* cited by examiner

*Primary Examiner*—David P Bryant
*Assistant Examiner*—Sarang Afzali
(74) *Attorney, Agent, or Firm*—Flynn, Thiel, Boutell & Tanis, P.C.

(57) ABSTRACT

The invention relates to a method of producing a plain bearing bush or bearing shell of varying width from a flat strip material, which comprises the following steps:
  incorporating grooves in the flat strip material along the bush or bearing-shell contour,
  rolling or bending the flat strip material into a bush or bearing-shell shape,
  mechanical severing of the excess marginal regions along the grooves,
  obtaining a finished plain bearing bush or bearing shell which has the final shape.

In this case, the invention is based on the idea of producing trapezoidal or stepped bushes as "shaped bushes" from strip material. The starting point in this case may be a strip of rectangular cross section, which is normally used for cylindrical bushes. The grooves can be incorporated in the flat strip material.

14 Claims, 2 Drawing Sheets

METHOD OF PRODUCING A PLAIN BEARING BUSH OR BEARING SHELL OF VARYING WIDTH

CROSS REFERENCE TO RELATED APPLICATION

This application is based on German application 10 2004 024746.3, filed May 19, 2004, which is incorporated herein by reference in its entirety.

FIELD OF THE INVENTION

The invention relates to a method of producing a plain bearing bush or bearing shell of varying width from a flat strip material and to a rolled plain bearing bush or bearing shell produced by the method.

BACKGROUND OF THE INVENTION

Sliding elements in the form of bushes or half shells are often produced from strip-shaped input stock. On account of their efficient means of production and the resulting favorable properties, rolled plain bearing bushes are being increasingly used. In this case, the initial material for the production is a strip having a smooth surface and, in some cases, embossed lubricating pockets or hole patterns. The strips are normally cut into plates and to a bush contour and are then bent in a circular shape. Respective embodiments of rolled sliding elements can thus already be adapted in a simple manner in the strip material to the respective requirements. Such sliding elements are used in general machine building, such as, for example, in construction and agricultural machines, and in particular as a connecting rod bush in the small connecting rod eye or as a piston boss bushing in the automotive sector.

Laid-Open Specification DE 199 07 571 A1 discloses a rolled plain bearing bush which has a bush width varying in the circumferential direction. To this end, the bush is produced from a strip section of varying width produced beforehand. Before the shaping, a bevel is applied to the flank sections of the formed plate by a further method step, for example by embossing. A varying bush width is intended in particular to save weight in the plain bearing bush pressed firmly into position and is at the same time to be adapted to the geometrical boundary conditions of a connecting rod or piston. After the rolling, the plain bearing bush is not subjected to any further machining of the width.

Furthermore, U.S. Pat. No. 4,907,626 discloses a rolled plain bearing produced from strip-shaped material. The strip material is provided with grooves, along which the strip is cut into pieces before the shaping process. Each strip section obtained in this way is then rolled into a bush.

SUMMARY OF THE INVENTION

On the basis of the previous knowledge, the object of the invention is to improve a method of producing plain bearings to the effect that, starting from simple strip geometries, plain bearings with complex shapes can be produced in a cost-effective manner.

The invention includes the technical teaching of a method of producing a plain bearing bush or bearing shell of varying width from a flat strip material, which comprises the following steps:

incorporating grooves in the flat strip material along the bush or bearing-shell contour, rolling or bending the flat strip material into a bush or bearing-shell shape, mechanical severing of the excess marginal regions along the grooves, obtaining a finished plain bearing bush or bearing shell which has the final shape.

In this case, the invention is based on the idea of producing trapezoidal or stepped bushes as "shaped bushes" from strip material. The starting point in this case may be a strip section of rectangular cross section, which is normally used for cylindrical bushes. The grooves can be incorporated in the flat strip material. Due to the grooves, a remaining web of residual material is produced, this web having a sufficiently small thickness in order to serve as a predetermined breaking point for the singularization. The flat strip material may in this case be a plate or may comprise rectangular sections punched out of a plate. In this case, larger strip sections, for example, may also be bent into a compact tube, from which individual plain bearings are then singularized. The mechanical severing can be effected merely by breaking off the excess marginal regions. Rework of the side flanks at the broken grooves is either unnecessary or is only necessary to a small extent.

The advantages achieved with the invention consist, in particular, in the possibility of producing plain bearings with complex shapes in an efficient and cost-effective manner, starting from simple strip geometries. Virtually any desired bush shape can be produced from the original simple strip sections. The basis for more complex plain bearing shapes is therefore a cylindrical plain bearing blank with incorporated grooves which is especially simple to manipulate. Specific material properties are appropriately used in the production process. In addition, the groove on the side flanks of the bush predetermines a bevel which can serve as assembly aid during fitting. To this end, various bevel angles can be predetermined solely by the design of the grooves. Thus, for example, complicated and costly machining of beveled or stepped surfaces is unnecessary.

A plurality of method variants which influence the material of the sliding element in different ways are suitable for incorporating the grooves. The grooves can be advantageously incorporated by means of embossing as an especially cost-effective method. In this case, local hardening by mechanical cold working takes place.

In a preferred embodiment, the grooves may be incorporated by means of milling. Milling is especially suitable in the case of hardenable alloys. The comparatively thin web material remaining along the grooves can also be hardened, thereby forming corresponding predetermined breaking points which break up during the mechanical severing.

Alternatively, the grooves may be advantageously incorporated by means of laser notching. In this way, local hardening can take place along the grooves by structural transformation. The predetermined breaking points required for a severing operation are produced by the hardening. It is advantageous in this case that, during a local structural transformation in the region of the grooves, the remaining material of the sliding element, in particular in the region of the stressed sliding surfaces, can be optimally adapted in its sliding properties.

In a further configuration, the grooves may be alternatively incorporated by means of roll notching. Local hardening by mechanical cold working also takes place in this method.

In a preferred embodiment of the invention, the material used may be a hardenable copper alloy. Copper alloys based on Cu—Sn—Ni and in particular CuSn6Ni6 are also used in this connection.

In the case of hardenable materials, before the mechanical severing along the grooves, age hardening is advantageously carried out at a temperature of between 300° C. and 450 20 and a process time of between 1 h and 19 h. In this way, in particular along the grooves, the predetermined breaking points are prepared for the desired fracture behavior during the mechanical separating operation. When selecting the material, it is taken into account here, and it is desirable here, that the bush is subjected to hardening overall during this process step.

In a further preferred embodiment of the invention, the materials used may also be nonhardenable copper alloys. Advantageously the copper alloy used is an alloy based on Cu—Sn—P, Cu—Zn—Si or also CuSn, for example CuSn8.

In a further preferred embodiment of the invention, a material based on a steel composite material or a multi-alloy bearing material may also be used.

In a preferred configuration of the invention, the mechanical severing along the grooves may be effected at a low temperature. Suitable for this purpose, for example, is liquid nitrogen, which has a correspondingly positive effect on the fracture behavior during the mechanical severing.

After the severing along the grooves, the side faces predetermined by the grooves may advantageously be deburred. To this end, with little effort, only the roughness in the broken-up and markedly thin web material is smoothed. The bevels located on the side faces need not be reworked. This can be effected in a simple manner by vibratory grinding.

Plain bearings may advantageously be coated. To this end, the coating processes already known may be used before or after the mechanical severing.

In a preferred configuration of the invention, rolled plain bearing bushes or half shells are produced using the method according to the invention.

BRIEF DESCRIPTION OF THE DRAWINGS

Exemplary embodiments of the invention are explained in more detail with reference to the schematic drawings, in which.

Parts corresponding to one another are provided with the same reference numerals in all the figures.

DETAILED DESCRIPTION OF THE INVENTION

Figure 1:
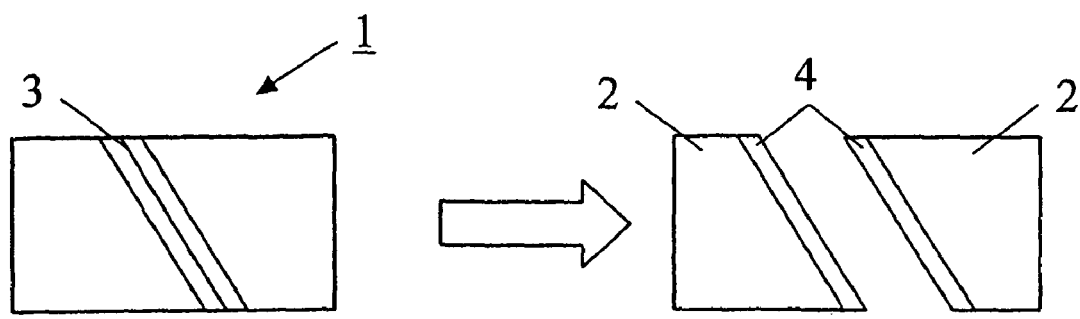
FIG. 1 schematically shows two bushes, sloping on one side, before and after the singularization by mechanical separation (cracking), FIG. 2 schematically shows a view of a cylindrical bush blank with one groove before the severing, and a bush sloping on one side and obtained by separation, FIG. 3 schematically shows a view of a cylindrical bush blank with two grooves before the severing, and a double-sloping bush obtained by separation, FIG. 4 schematically shows a cylindrical bush blank with one groove before the severing, and a bush stepped on one side and obtained by separation, and FIG. 5 schematically shows a cylindrical bush blank with two grooves before the severing, and a double-stepped bush obtained by separation.

FIG. 1 schematically shows two bushes 2, sloping on one side, before and after the sigularization by mechanical separation (cracking). The depth of the groove 3 in the material is such that it serves as a predetermined breaking point for the mechanical severing along the residual web formed by the groove 3. As a result, a bevel 4 is formed from the side faces of the groove 3 in the manufacturing process during the singularization, this bevel 4 serving as assembly aid for fitting. The bevel angle is correspondingly predetermined by the notch angle when the groove 3 is being incorporated. No scrap occurs in this exemplary embodiment. If necessary, the roughness formed along the residual web by mechanical severing can be smoothed by deburring.

Figure 2:
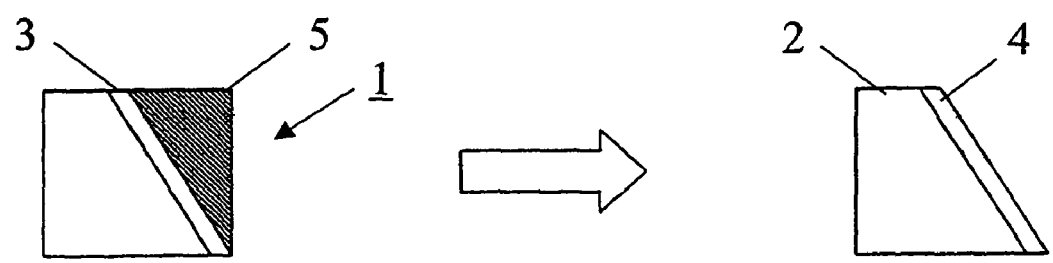

Based on a cylindrical bush blank 1 with one groove 3 before the severing, FIG. 2 shows a view of a bush 2 sloping on one side and obtained by separation. In this case, the severed marginal region 5 may be recycled as scrap material.

Figure 3:
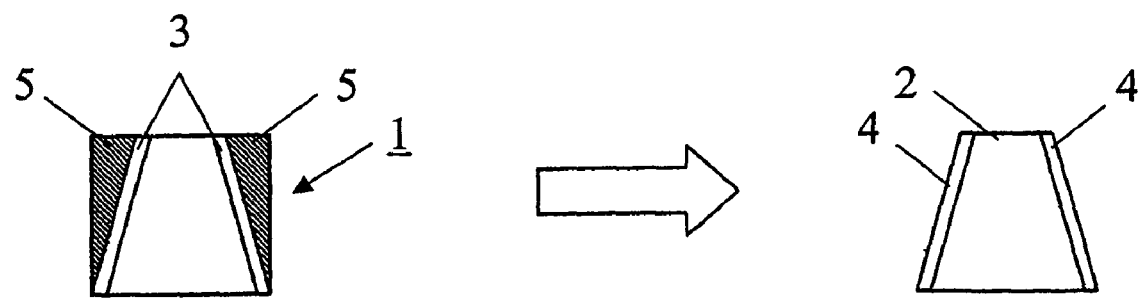

FIG. 3 shows a view of a cylindrical bush blank 1 with two grooves 3 before the severing and a double-sloping bush 2 obtained by separation. Due to the groove 3 on both sides, a bevel 4 is formed on the two respective side faces. The excess material 5 can be largely avoided in this case if, in a similar manner to FIG. 1, the cylindrical bush blank 1 consists of an elongated tubular body in which a multiplicity of bushes 2 are arranged directly next to one another.

Figure 4:
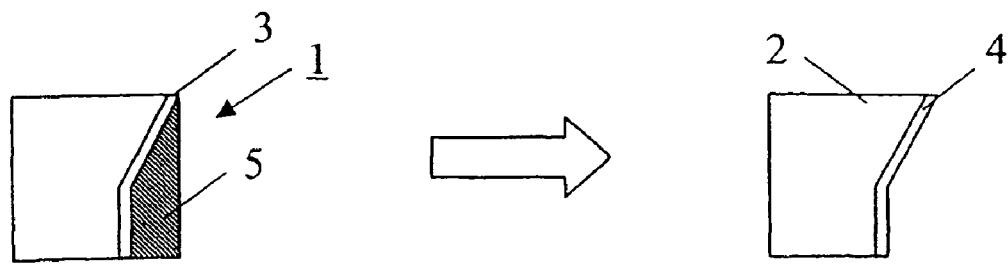

FIG. 4 shows a view of a cylindrical bush blank 1 before the severing along a groove 3 and a bush 2 stepped on one side and obtained by separation. The groove 3 runs in accordance with the contour of the bush 2 produced in the subsequent method step.

Figure 5:
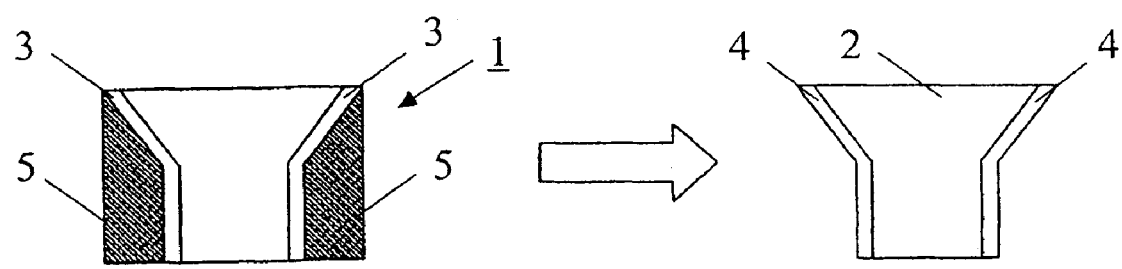

A view of a cylindrical bush blank 1 with two grooves 3 before the severing and a double-stepped bush 2 obtained by separation is shown in a further exemplary embodiment according to FIG. 5. Corresponding bevels 4 form on both side faces.

Figure 6:
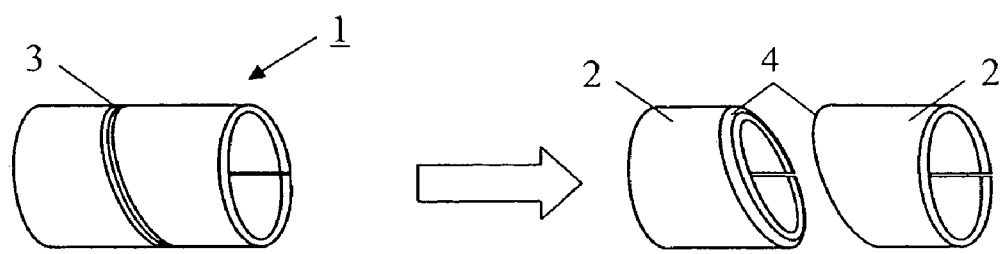
FIG. 6 schematically shows a cylindrical bush both before and after severing.

FIG. 6 shows a cylindrical bush made from the method described above. A bush blank 1 is shown at the left with a groove 3 therein. After severing at the groove 3, two bushes 2 are formed, each with bevels 4.

What is claimed is:

1. A method of producing a plain bearing bush or bearing shell of varying width from a flat strip material, which comprises the following steps:

incorporating grooves into a flat strip material, a web of residual material being produced along the grooves to provide a predetermined breaking point along the grooves;

rolling or bending the flat strip material into a bush or bearing-shell shape;

age hardening the web at a temperature of between 300° C. and 450° C. for a time period between 1 hour and 19 hours;

mechanically severing the web which extends along the grooves; and obtaining a finished plain bearing bush or bearing shell which has a final shape.

2. The method as claimed in claim 1, wherein the flat strip material is a hardenable copper alloy.

3. The method as claimed in claim 2, wherein the hardenable copper alloy is based on Cu—Sn—Ni.

4. The method as claimed in claim 1, wherein the flat strip material is a nonhardenable copper alloy.

5. The method as claimed in claim 4, wherein the nonhardenable copper alloy is based on one of Cu—Sn—P and Cu—Zn—Si.

6. The method as claimed in claim 1, wherein the grooves are incorporated by embossing.

7. The method as claimed in claim 1, wherein the grooves are incorporated by milling.

8. The method as claimed in claim 1, wherein the grooves are incorporated by laser notching.

9. The method as claimed in claim 1, wherein the grooves are incorporated by roll notching.

10. The method as claimed in claim 1, wherein the flat strip material is a steel composite material or a multi-alloy bearing material.

11. The method as claimed in claim 1, wherein the step of mechanically severing the web which extends along the grooves is effected at a low temperature.

12. The method as claimed in claim 1, wherein the step of mechanically severing the web which extends along the grooves creates side faces of the plain bearing bush or bearing shell, and the method further comprises the step of deburring the side faces after the step of mechanically severing the web which extends along the grooves.

13. The method as claimed in claim 1, further comprising the step of coating the plain bearing bush or bearing shell.

14. The method as claimed in claim 1, wherein the step of mechanically severing the web occurs after the step of age hardening the web.

* * * * *